United States Patent [19]
Mikami et al.

[11] Patent Number: 5,954,618
[45] Date of Patent: Sep. 21, 1999

[54] SLIP CONTROL SYSTEM

[75] Inventors: Kazuhiro Mikami; Muneo Kusafuka; Kazuomi Okasaka; Kiyoshi Nagami; Koji Hayakawa; Kazuhito Yamada, all of Anjo, Japan

[73] Assignee: Aisin AW Co., Ltd., Anjo, Japan

[21] Appl. No.: 08/926,431

[22] Filed: Sep. 10, 1997

[30] Foreign Application Priority Data

Sep. 12, 1996 [JP] Japan ................................. 8-242269

[51] Int. Cl.$^6$ ................................................. F16H 61/14
[52] U.S. Cl. ............................ 477/174; 477/176; 477/97
[58] Field of Search ............................ 477/62, 174, 175, 477/176, 177, 97, 98; 701/67

[56] References Cited

U.S. PATENT DOCUMENTS

| | | | |
|---|---|---|---|
| 4,081,065 | 3/1978 | Smyth et al. | 477/176 |
| 4,468,988 | 9/1984 | Hiramatsu . | |
| 4,502,579 | 3/1985 | Makita | 477/175 X |
| 4,651,142 | 3/1987 | Klatt | 192/30 W X |
| 5,050,717 | 9/1991 | Shibayama | 477/65 X |
| 5,105,926 | 4/1992 | Yoshimura et al. | 477/169 |
| 5,347,885 | 9/1994 | Taga et al. | 477/76 X |
| 5,403,250 | 4/1995 | Juergens | 477/176 |
| 5,425,687 | 6/1995 | Taga et al. | 477/174 X |
| 5,527,233 | 6/1996 | Tabata et al. | 477/62 |
| 5,626,535 | 5/1997 | Kono et al. | 477/174 X |
| 5,643,136 | 7/1997 | Kono et al. | 477/174 X |

FOREIGN PATENT DOCUMENTS

63-13060  2/1982  Japan .

*Primary Examiner*—Charles A Marmor
*Assistant Examiner*—Scott Lund
*Attorney, Agent, or Firm*—Oliff & Berridge, PLC

[57] ABSTRACT

A slip control system for an automatic transmission includes a fluid coupling including a release side oil chamber, an apply side oil chamber and a lockup clutch unit that is applied and released on an basis of the oil pressure that is fed to at least one of the release side oil chamber and the apply side oil chamber; an oil pressure generating unit for generating the oil pressure; a vehicular running state detecting unit for a detecting vehicular running state; an electronic control unit for determining whether a slip control is to be made, on the basis of a determination upon whether the present vehicular running state, as detected by the vehicular running state detecting unit, belongs to a predetermined slip control region; and an oil pressure regulating unit for regulating the oil pressure in response to a signal coming from the electronic control unit, to make the slip control by sliding the lockup clutch unit. The electronic control unit determines the state of a heat, as generated according to the slip control; and changes the slip control region on the basis of the heat state.

4 Claims, 10 Drawing Sheets

SLIP CONTROL SYSTEM

BACKGROUND OF THE INVENTION

1. Field of the Invention

The invention relates to a slip control system.

2. Description of the Related Art

In the related art, an automatic transmission is structured to have a torque converter acting as a fluid coupling for transmitting the rotation of an engine, as transmitted through a crankshaft, to the input shaft of a speed change unit through the torque converter.

This torque converter is composed of a pump impeller, a turbine runner, a stator, a lockup clutch unit and a damper unit. The rotation of the engine is transmitted through a front cover to the pump impeller, and a turbine runner is rotated by the flow of oil, as established according to the rotation of the pump impeller, so that its rotation is transmitted to the input shaft of the speed change unit.

The lockup clutch unit is equipped with a clutch plate that is arranged to move axially, and a friction member is attached to the clutch plate. When a predetermined vehicle speed is achieved after a start of the vehicle, the friction member, as attached to the clutch plate, and the front cover come into contact to apply the lockup clutch unit. As a result, the rotation of the engine is transmitted to the input shaft directly rather than through the torque converter, so that the mileage can be accordingly improved.

In order to improve the mileage, it is conceivable to apply the lockup clutch unit in a lower vehicle speed region than the predetermined vehicle speed region. When the engine is run, there is a possibility that a torque fluctuation will arise in the combustion chamber of the engine. If this torque fluctuation occurs when the vehicle is run at a low speed, the vehicle cannot be run stably.

Thus, there has been provided (as disclosed in Japanese Patent Publication No. 13060/1982) an automatic transmission which allows the vehicle to be run stably under these conditions by sliding the lockup clutch unit to perform a slip control. Therefore, if the torque fluctuation occurs in the engine in a low vehicle speed range, the fluctuation can be absorbed by the lockup clutch unit. During the slip control, the friction member, as attached to the clutch plate, and the front cover slide relative to each other generating a frictional heat and deteriorating the friction member. Thus, the region for the slip control, i.e., the slip control region is set to enhance the durability of the friction member. However, in the automatic transmission of the related art, the slip control cannot be properly performed as a result of production dispersion and aging of the lockup clutch unit, and the amount of frictional heat, i.e., the calorific value may not be maintained within a proper range. Therefore, the lifetime of the lockup clutch unit is shortened or the mileage obtained by the vehicle is deteriorated.

SUMMARY OF THE INVENTION

An object of the invention is to solve the aforementioned problems of the slip control system of the related art and to provide a slip control system that performs the slip control properly, confining the calorific value within a proper range even if the lockup clutch unit has a production dispersion and is aging.

In an embodiment of the invention, there is provided a slip control system for an automatic transmission, comprising: a fluid coupling including a released side oil chamber, an applied side oil chamber and a lockup clutch unit to be applied/released on the basis of the oil pressure, as fed to at least one of the released side oil chamber and the applied side oil chamber; an oil pressure generating unit for generating the oil pressure; a vehicular running state detecting unit for detecting a vehicular running state; an electronic control unit for determining whether a slip control is to be made, on the basis of a determination whether the present vehicular running state, as detected by the vehicular running state detecting means, falls within a predetermined slip control region; and an oil pressure regulating unit for regulating the oil pressure in response to a signal coming from the electronic control unit, to actuate slip control by sliding the lockup clutch unit, wherein the electronic control unit includes: state determining means for determining the state of a heat, as generated according to the slip control; and slip control region changing means for changing the slip control region on the basis of the heat state, as determined by the state determining means.

In another slip control system of the invention, the state determining means determines whether the lockup clutch unit is in an overheated state.

In still another slip control system of the invention, the state determining means has calorific value calculating means for calculating the calorific value of the lockup clutch unit, and compare means for comparing the calculated calorific value and a predetermined reference value.

Moreover, the compare means determines whether the lockup clutch unit is in the overheated state on the basis of the comparison result.

Still another slip control system of the invention further comprises: oil temperature detecting means for detecting an oil temperature in the fluid coupling and the state determining means has compare means for comparing the oil temperature, as detected by the oil temperature detecting means, and a predetermined reference value.

Moreover, the compare means determines whether the lockup clutch unit is in the overheated state on the basis of the comparison result.

In still another slip control system of the invention, the vehicular running state detecting means includes a throttle opening sensor. The slip region changing means changes the slip control region if the state, in which the calorific value is larger than the reference value, continues for a predetermined time period or longer, on the basis of the throttle opening for the time period, and ends the slip control.

DESCRIPTION OF THE PREFERRED EMBODIMENTS

Embodiments of the invention will be described in detail with reference to the accompanying drawings.

Figure 1:
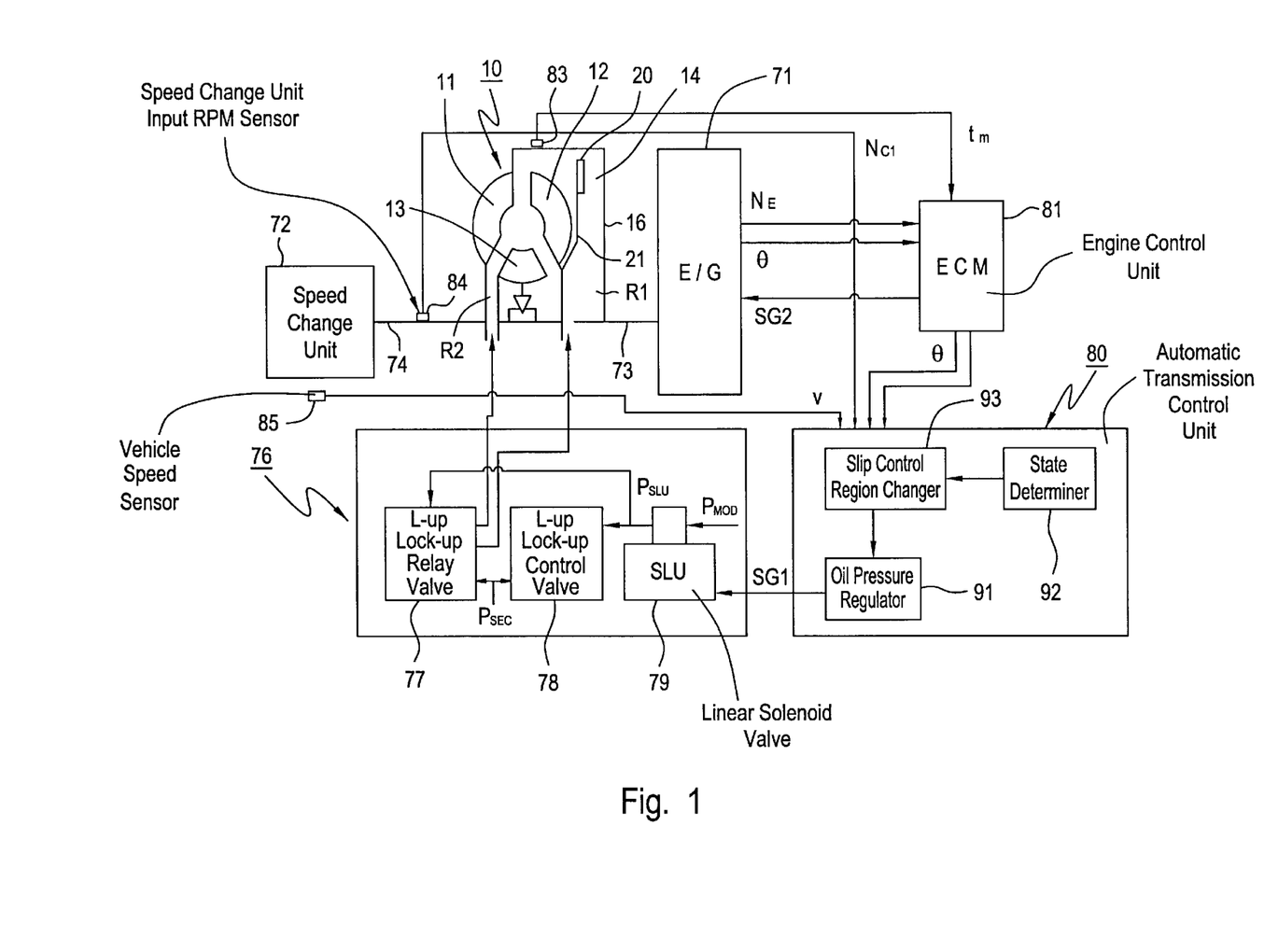
FIG. 1 is a control block diagram showing an automatic transmission according to a first embodiment of the invention.
Figure 2:
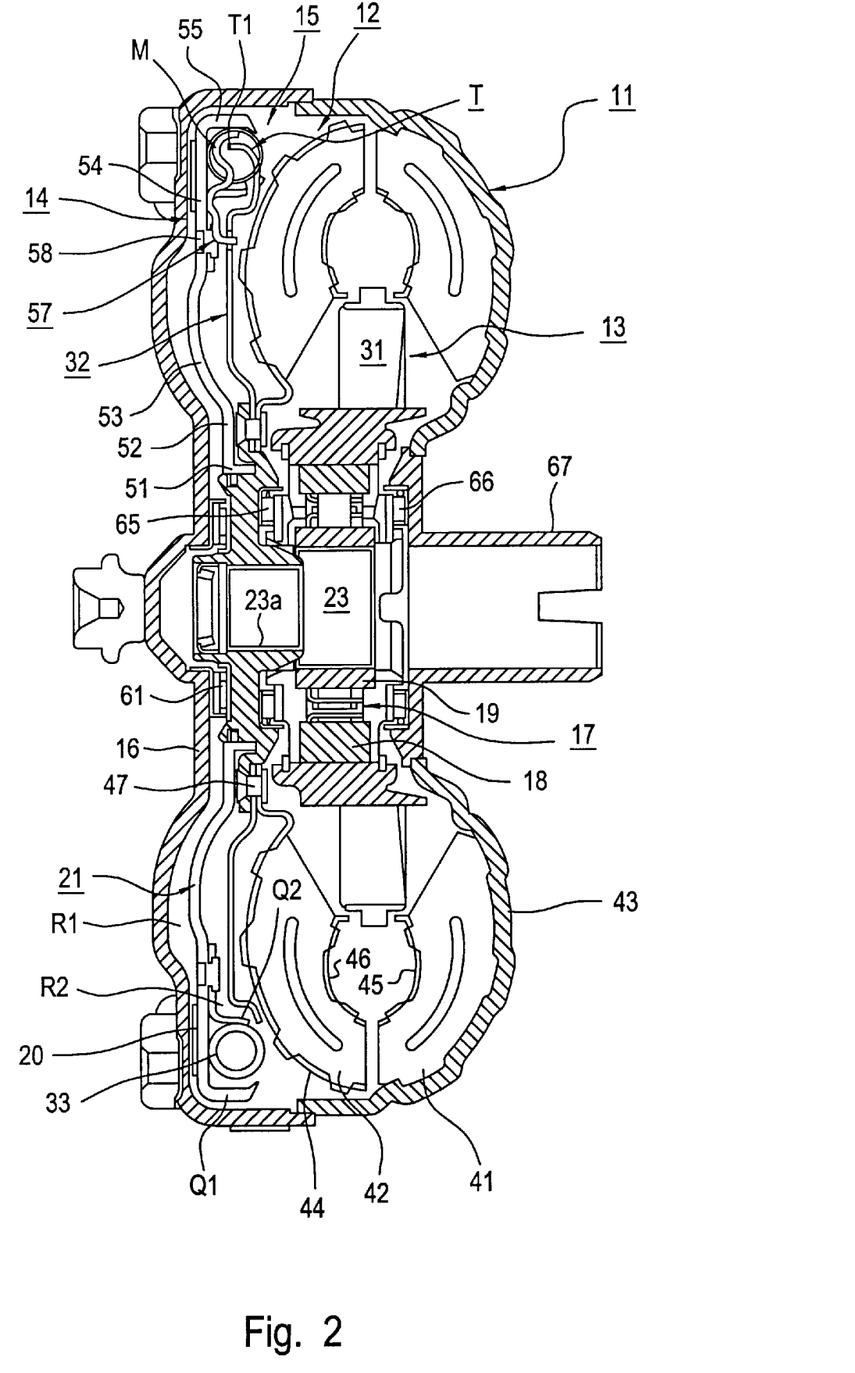
FIG. 2 is a cross sectional view showing a torque converter in the first embodiment of the invention.
Figure 3:
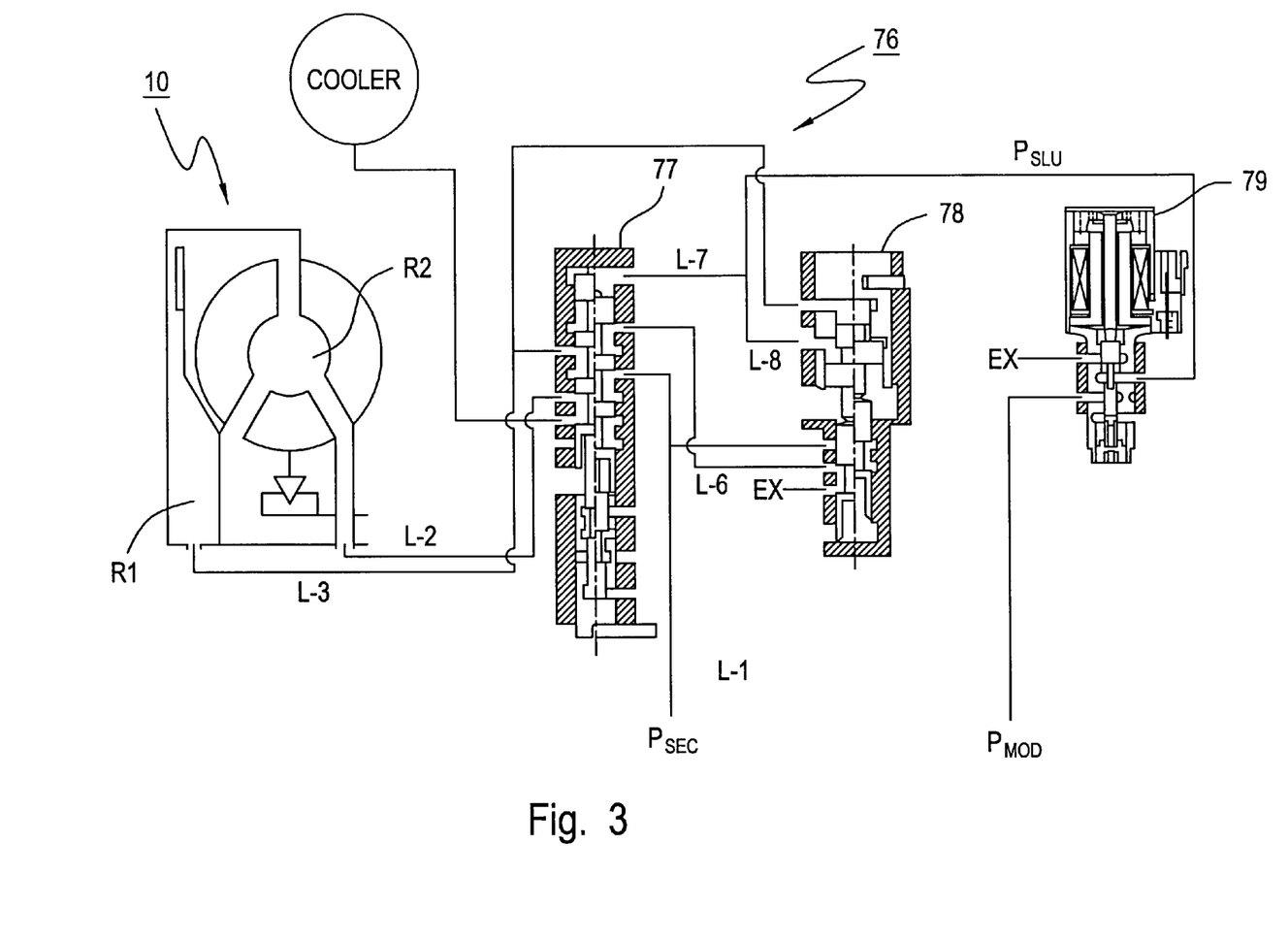
FIG. 3 is a schematic diagram showing a hydraulic circuit in the first embodiment of the invention.

FIG. 1 is a control block diagram showing an automatic transmission according to a first embodiment of the invention; FIG. 2 is a section showing a torque converter in the first embodiment of the invention; and FIG. 3 is a schematic diagram showing a hydraulic circuit in the first embodiment of the invention.

As shown, a torque converter 10 acting as a fluid coupling is structured to include a pump impeller 11, a turbine runner 12 forming a torus together with the pump impeller 11, a stator 13, a lockup clutch unit 14 and a damper unit 15.

The rotation of an engine (E/G) 71 is transmitted through a crankshaft 73 to a front cover 16 and further to the pump impeller 11 which is fixed on the front cover 16. As the pump impeller 11 rotates, the oil in the torus turns around the shaft of the torque converter 10 and is circulated among the pump impeller 11, the turbine runner 12 and the stator 13 by the centrifugal force.

When the pump impeller 11 just starts its rotation, as at the start of the vehicle, the pump impeller 11 and the turbine runner 12 have a large difference in RPM. The oil, as emanating from the turbine runner 12, flows in a direction to obstruct the rotation of the pump impeller 11. Therefore, a stator 13 is arranged between the pump impeller 11 and the turbine runner 12 to change the flow of oil into a direction to aid the rotation of the pump impeller 11 if the difference in the RPM between the pump impeller 11 and the turbine runner 12 is large.

When the RPM of the turbine runner 12 increases so that the RPM difference between the pump impeller 11 and the turbine runner 12 decreases, the oil having hit the front sides of the blades 31 of the stator 13 then hits the back sides to obstruct the oil flow.

At the inner circumferential side of the stator 13 a one-way clutch 17 enables the stator 13 to rotate in a predetermined direction. As the oil hits the back sides of the blades 31, the stator 13 naturally rotates to circulate the oil smoothly. The one-way clutch 17 is composed of an outer race 18 and an inner race 19. The outer race 18 is fixed on the stator 13, and the inner race 19 is fixed on the casing of the not-shown automatic transmission.

Thus, the torque converter 10 acts as a torque converter to amplify the transmission torque, if the RPM difference between the pump impeller 11 and the turbine runner 12 is large. If the RPM difference is small, the torque converter 10 acts as a fluid coupler.

The lockup clutch unit 14 is described below.

When a preset vehicle speed is reached after start, the lockup clutch 14 is applied. Then, the rotation of the engine 71 is transmitted to the input shaft 74 of a speed change unit 72 directly without passing through the oil of the torque converter so that the mileage can be improved. The lockup clutch unit 14 is actuated, when a lockup (L-up) relay valve 77 switches the oil feed, so that a clutch plate 21 is axially brought into and out of contact with the front cover 16 through a friction member 20.

A release side oil chamber R1 is formed between the clutch plate 21 and the front cover 16, and an apply side oil chamber R2 is formed between the clutch plate 21 and the turbine runner 12. As a result, the lockup clutch unit 14 is released, when the oil is fed to the release side oil chamber R1 from a hydraulic circuit 76 acting as oil pressure generating means. In addition, the lockup clutch unit 14 is applied when the oil is fed to the apply side oil chamber R2 from the hydraulic circuit 76. The friction member 20 is fixed on the clutch plate 21 in the present embodiment but could be fixed on the front cover 16.

When the lockup clutch unit 14 is applied, the rotation of the crankshaft 73 is transmitted directly to the input shaft 74 through the front cover 16, the clutch plate 21, the damper unit 15 and a turbine hub 23. In the inner circumference of the turbine hub 23, there is formed a spline groove 23a for splining the turbine hub 23 and the input shaft 74.

Reference numeral 61 designates a thrust bearing arranged between the turbine hub 23 and the front cover 16; numeral 65 designates a thrust bearing arranged between the stator 13 and the turbine hub 23; and numeral 66 designates a thrust bearing arranged between the stator 13 and a sleeve 67.

The damper unit 15 is described below.

The damper unit 15 is provided for absorbing the fluctuation in the transmitted torque and is fixed on the clutch plate 21 by caulking or other means. The damper unit 15 is composed of a drive plate 57 to be rotated together with the clutch plate 21, a driven plate 32 arranged to face the drive plate 57 and rotated together with the turbine runner 12, and a spring 33. Reference numeral 58 designates a caulked portion.

The spring 33 is provided for a first stage and is arranged in a plurality of, e.g., eight positions in the circumferential direction of the clutch plate 21. Other not-shown springs for a second stage are arranged alternately between the springs 33 in a plurality of, e.g., four positions in the circumferential direction of the clutch plate 21. Moreover, the second stage springs are made radially smaller and shorter than the springs 33, and begin to warp after the transmitted torque of the spring 33 has reached the bending point value.

As a result, the rotation, as transmitted from the front cover 16 through the friction member 20, is transmitted through the damper unit 15 to the turbine hub 23. In this transmission, the springs 33 and the second stage springs contract to absorb the transmitted torque, so that they can prevent the vibrations and noises.

The pump impeller 11 is composed of blades 41, an outer shell 43 and an inner core 45, and the turbine runner 12 is composed of blades 42, an outer shell 44 and an inner core 46. The outer shell 44 of the turbine runner 12 is connected to the turbine hub 23 together with the driven plate 32 by rivets 47.

The clutch plate 21 is composed of: a first cylindrical rising portion 51 axially extending and sliding along a sliding face formed on the turbine hub 23; a first flat portion 52 extending radially outward from the first rising portion 51; a curved portion 53 extending radially outward from the first flat portion 52; a second flat portion 54 extending radially outward from the curved portion 53; and a second cylindrical rising portion 55 extending axially from the second flat portion 54.

The second rising portion 55 forms an outside retaining portion Q1 for the springs 33. In addition, the drive plate 57 is arranged to surround and retain the springs 33 together with the clutch plate 21 and to transmit the rotation of the clutch plate 21 to the springs 33 and the second stage springs.

At the eight positions in the circumferential direction of the outer circumferential edge of the drive plate, there are formed spring drive pawls M for pushing the springs 33 when the lockup clutch unit 14 is applied to rotate the clutch plate 21 forward (as will be called the "forward drive") and when the clutch plate 21 rotates backward (as will be called the "backward drive") at an engine braking time. The springs 33 are retained by the spring drive pawls M, the outer retaining portion Q1 and an inner retaining portion Q2.

In addition, the driven plate 32 is extended along the turbine runner 12. From eight circumferential positions of the driven plate 32, there are radially protruded spring abutment pawl portions T which correspond to the spring drive pawls M and have leading ends T1 directed axially. These spring abutment pawl portions T receive the springs 33 at the forward drive time and at the backward drive time of the clutch plate 21.

In order to apply/release the lockup clutch unit 14 and to effect the slip control, the hydraulic circuit 76 is equipped with the lockup relay valve 77, a lockup (L-up) control valve 78 and a linear solenoid valve (SLU) 79.

The lockup relay valve 77 takes a righthand half position as shown in FIG. 3 at the applied time and at the slip control time of the lockup clutch unit 14 and a lefthand half position at the released time of the lockup clutch unit 14. At the applied time of the lockup clutch unit 14, therefore, a secondary regulator pressure $P_{SEC}$, as fed through an oil line L-1, is fed via an oil line L-2 to the applied side oil chamber R2. At the released time of the lockup clutch unit 14, the secondary regulator valve $P_{SEC}$, as fed via the oil line L-1, is fed via an oil line L-3 to the released side oil chamber R1.

At the slip control time of the lockup clutch unit 14, the oil pressure from the released side oil chamber R1 is fed via the oil line L-3, the lockup relay valve 77 and an oil line L-6 to the lockup control valve 78. This lockup control valve 78 receives a solenoid pressure $P_{SLU}$ from the linear solenoid valve 79 via an oil line L-8 to control the communication between the oil line L-6 and a drain port EX. As a result, the oil pressure in the released side oil chamber R1 is controlled according to the solenoid pressure $P_{SLU}$ from the linear solenoid valve 79, so that a differential pressure ΔP between the released side oil chamber R1 and the applied side oil chamber R2 is controlled to effect the slip control.

In response to a slip control command signal SG1 from an automatic transmission control unit 80, in addition the linear solenoid valve 79 regulates a solenoid modulator pressure $P_{MOD}$ to establish and feed the solenoid pressure $P_{SLU}$ to the lockup relay valve 77 via an oil line L-7 and to the lockup control valve 78 via the oil line L-8.

An engine control unit (ECM) 81 controls the engine 71. The engine control unit 81 produces an ignition signal SG2 on the basis of an engine RPM $N_E$, a throttle opening θ and an oil temperature $t_m$ in the torque converter 10, and controls the engine 71 on the basis of the ignition signal SG2. For this control, the engine 71 is equipped with an engine RPM sensor and a throttle opening sensor, although not shown, and the torque converter 10 is equipped with an oil temperature sensor 83 acting as oil temperature detecting means.

The automatic transmission control unit 80 is composed of: oil pressure regulating means 91 for controlling the aforementioned pressure difference ΔP in a slip control region, as set on the basis of vehicular running conditions such as a vehicle speed v and the throttle opening θ; state determining means 92 for determining the state of heat, as generated according to the slip control; and slip control region changing means 93 for changing the slip control region on the basis of the heat state, as determined by the state determining means 92.

Reference numeral 84 designates a speed change unit input RPM sensor arranged on the input shaft 74 for detecting a speed change unit input RPM $N_{C1}$, and numeral 85 designates a vehicle speed sensor arranged in the speed change unit 72.

The operations of the slip control system in the automatic transmission thus structured will be described with reference to flow charts.

Figure 4:
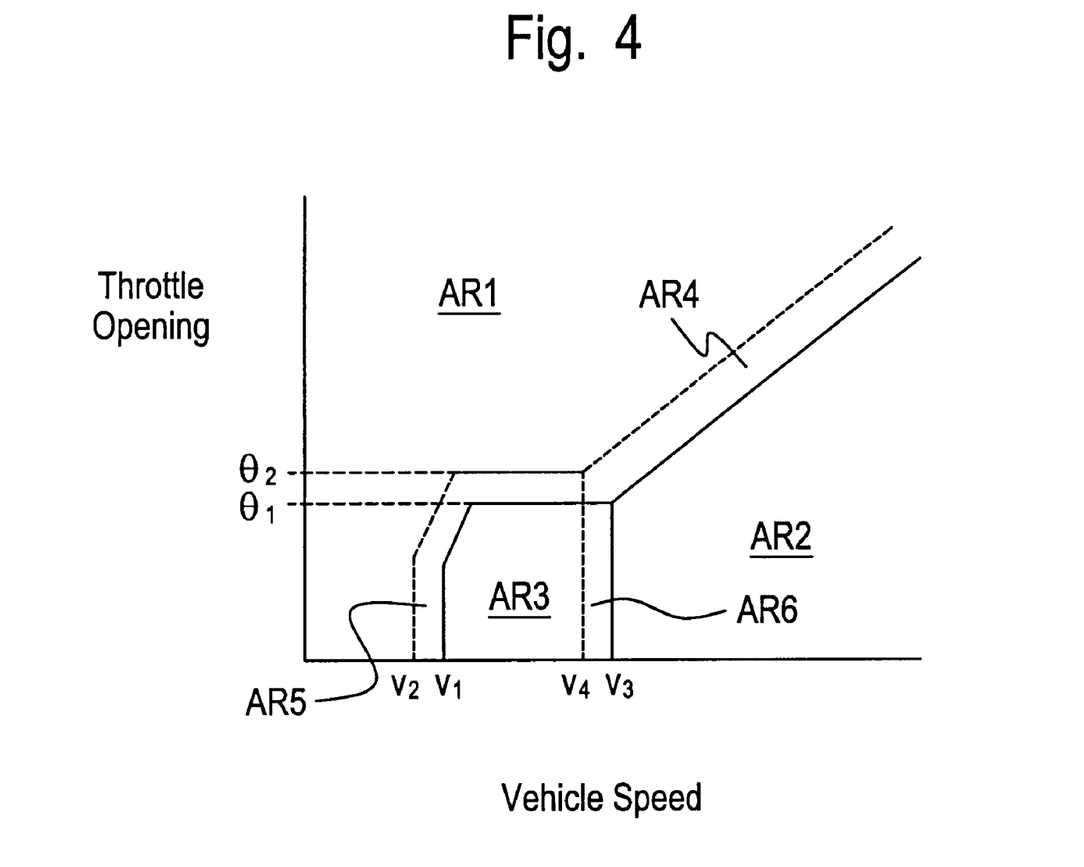
FIG. 4 is a diagram illustrating a slip control region map in the first embodiment of the invention.
Figure 5:
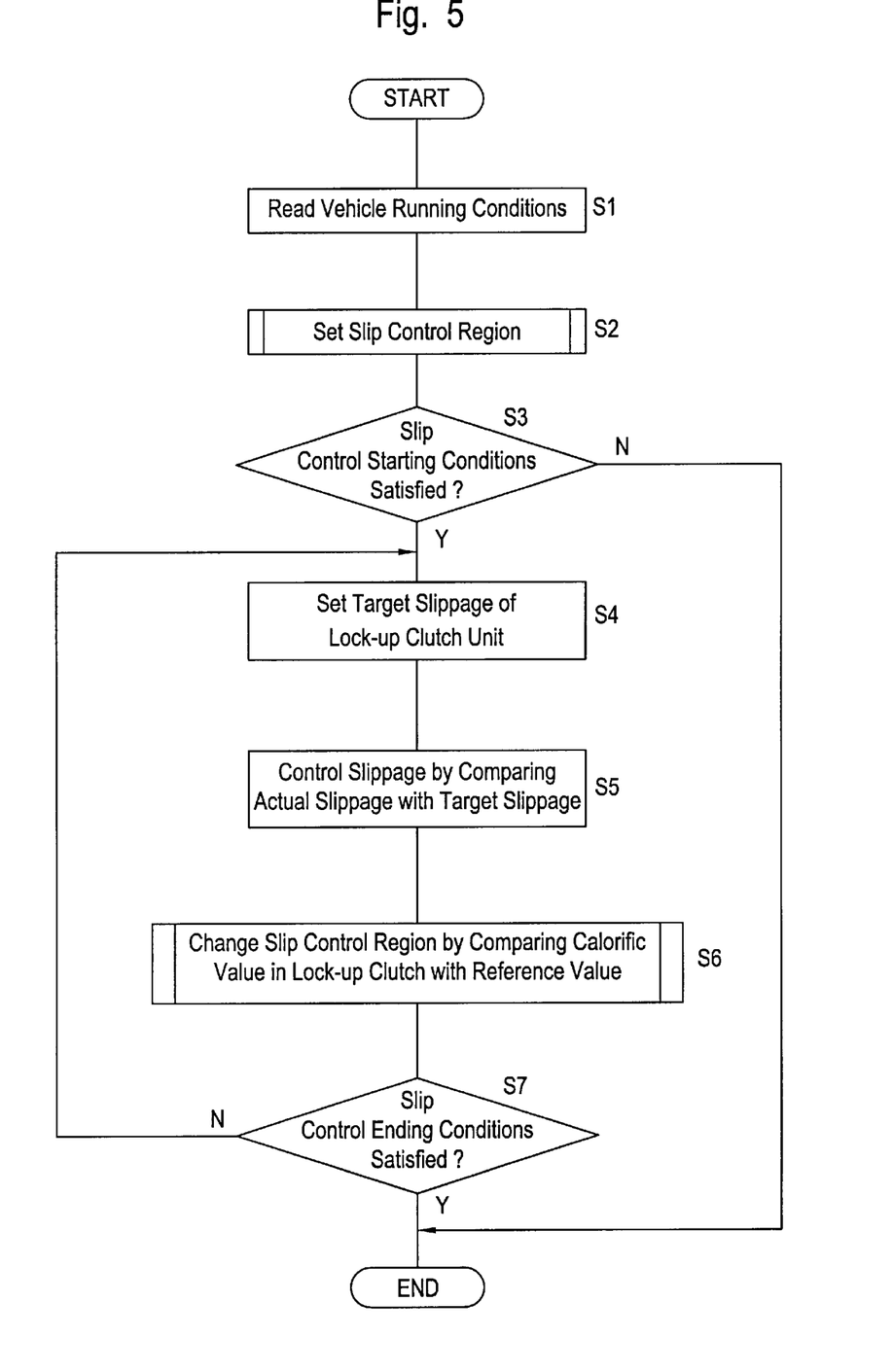
FIG. 5 is a flow chart showing a main routine of a slip control in the first embodiment of the invention.
Figure 6:
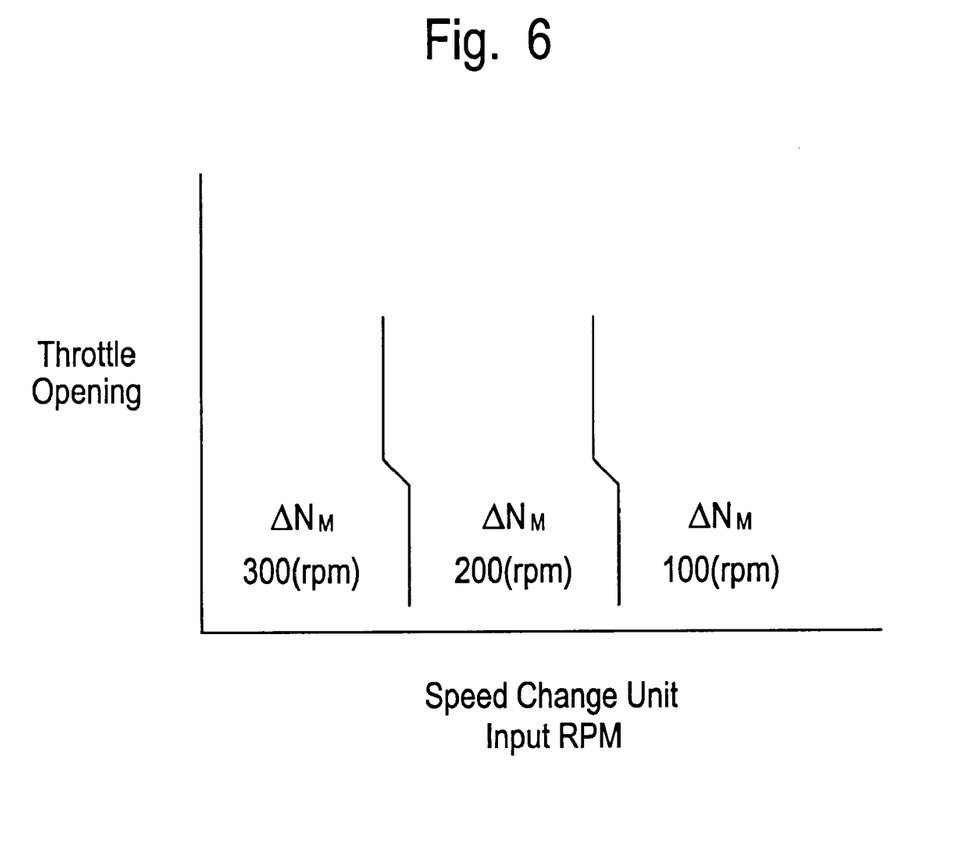
FIG. 6 is a diagram illustrating a target slippage map in the first embodiment of the invention.

FIG. 4 is a diagram illustrating a slip control region map in the first embodiment of the invention; FIG. 5 is a flow chart showing a main routine of a slip control in the first embodiment of the invention; and FIG. 6 is a diagram illustrating a target slippage map in the first embodiment of the invention. In FIG. 4, an abscissa indicates the vehicle speed v, and an ordinate indicates the throttle opening θ. In FIG. 6, an abscissa indicates the speed change unit input RPM $N_{C1}$, and an ordinate indicates the throttle opening θ.

Step S1: The automatic transmission control unit 80 responds to the vehicular running state signal to read the vehicle running conditions including the vehicle speed v, the engine RPM $N_E$, the throttle opening θ and the speed change unit input RPM $N_{C1}$.

Step S2: The slip control region is set.

Step S3: With reference to the slip control region map of FIG. 4, the automatic transmission control unit 80 determines whether the slip control starting conditions are satisfied. The routine is advanced to Step S4, if the answer is "YES", but is ended if "NO".

In the slip control region map, there are set: lockup clutch release region AR1 in which the lockup clutch unit 14 is released; a lockup clutch apply region AR2 in which the lockup clutch unit 14 is applied; a slip control region AR3 in which the slip control is made; a hysteresis region AR4 between the lockup clutch release region AR1 and the lockup clutch apply region AR2; a hysteresis region AR5 between the lockup clutch release region AR1 and the slip control region AR3; and a hysteresis region AR6 between the lockup clutch apply region AR2 and the slip control region AR3.

In the hysteresis region AR4, the conditions, as indicated by a solid line, are applied at a transfer from the lockup clutch release region AR1 to the lockup clutch apply region AR2. The conditions, as indicated by a broken line, are applied at a transfer from the lockup clutch apply region AR2 to the lockup clutch release region AR1.

In the hysteresis region AR5, in addition, the conditions, as indicated by a solid line, are applied at a transfer from the lockup clutch release region AR1 to the slip control region AR3. The conditions, as indicated by a broken line, are applied at a transfer from the slip control region AR3 to the lockup clutch release region AR1.

In the hysteresis region AR6, the conditions, as indicated by a solid line, are applied at a transfer from the slip control region AR3 to the lockup clutch apply region AR2. The conditions, as indicated by a broken line, are applied at a transfer from the lockup clutch apply region AR2 to the slip control region AR3.

Here, characters $v_1$ designate a slip control starting vehicle speed, and characters $v_2$ designate a slip control ending vehicle speed. When the vehicle speed v becomes lower than the slip control starting vehicle speed $v_1$, the torque fluctuation of the engine 71 cannot be absorbed by the lockup clutch unit 14 even if the lockup clutch unit 14 is slid. Thus, the slip control starting vehicle speed $v_1$ indicates the limit of the slip control.

In addition, characters $v_3$ designate a lockup clutch application starting vehicle speed, and characters $v_4$ designate a lockup clutch application ending vehicle speed. When the vehicle speed v becomes higher than the lockup clutch application starting vehicle speed $v_3$, the lockup clutch unit 14 is applied. The lockup clutch application starting vehicle speed $v_3$ indicates the limit of the application of the lockup clutch unit 14, below which the vehicle can be stably run even if the torque fluctuation of the engine 71 is transmitted to the speed change unit 72 when the lockup clutch unit 14 is applied.

Characters $\theta_1$ designate a slip control starting throttle opening, and characters $\theta_2$ designate a slip control ending throttle opening. When the throttle opening $\theta$ exceeds the slip control ending throttle opening $\theta_2$, it is not possible any more to suppress the heat (calories) generated by sliding the lockup clutch unit 14. Thus, the slip control ending throttle opening $\theta_2$ indicates the limit of the slip control.

Thus, the lockup clutch release region AR1, the lockup clutch apply region AR2 and the slip control region AR3 are set on the basis of the slip control starting vehicle speed $v_1$, the slip control ending vehicle speed $v_2$, the lockup clutch application starting vehicle speed $v_3$, the lockup clutch application ending vehicle speed $v_4$, the slip control starting throttle opening $\theta_1$ and the slip control ending throttle opening $\theta_2$.

Step S4: With reference to a target slippage map of FIG. 6, the automatic transmission control unit 80 sets a target slippage $\Delta N_M$ (e.g., 100, 200 or 300 [rpm]) corresponding to the speed change unit input RPM $N_{C1}$ and the throttle opening $\theta$. In this case, the target slippage $\Delta N_M$ is a slippage of the lockup clutch unit 14, as generated at the time of the slip control, that is, a target value of the difference between the engine RPM $N_E$ and the speed change unit input RPM $N_{C1}$.

Step S5: If the actual slippage of the lockup clutch unit 14 is designated by $\Delta N$, the slippage is controlled on the basis of the actual slippage $\Delta N$ and the target slippage $\Delta N_M$. This slippage control is carried out by the feed forward control or the feedback control.

Step S6: The slip control region is changed. Specifically, the not-shown calorific value calculating means of the state determining means 92 calculates the calorific value Q in the lockup clutch unit 14, and the not-shown compare means compares the calculated calorific value Q and a reference value a. On the basis of the comparison result, the state determining means 92 determines whether the lockup clutch unit 14 is in an overheated state. On the basis of this determination result of the state determining means 92, the slip control region changing means 93 changes the slip control region AR3.

Step S7: With reference to the slip control region map of FIG. 4, the automatic transmission control unit 80 determines whether the slip control ending conditions are satisfied. The routine is ended, if the slip control ending conditions are satisfied, and is returned to Step S4 if not.

Here will be described a subroutine of the slip control region setting process of Step S2 of FIG. 5.

Figure 7:
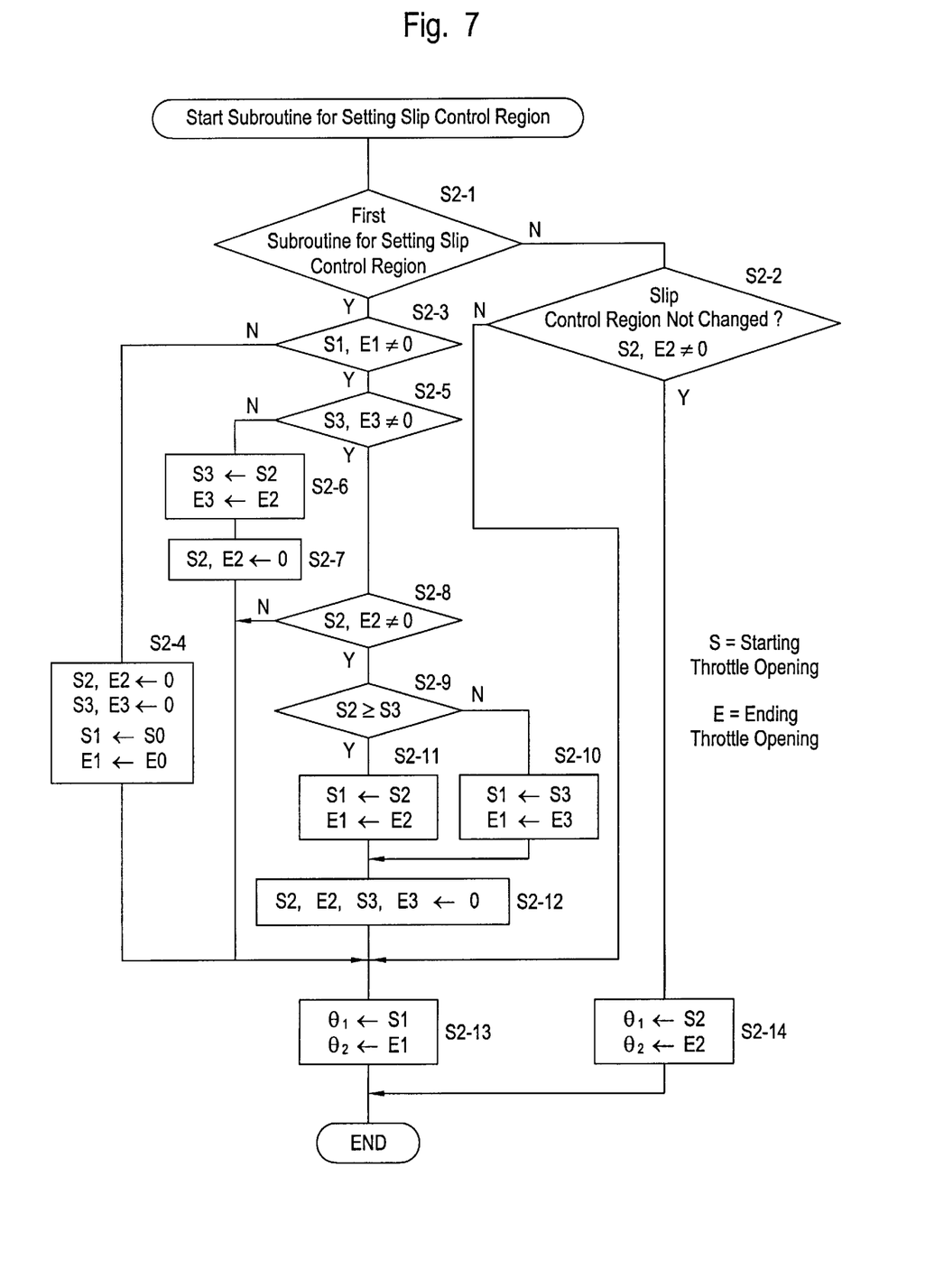
FIG. 7 is a flow chart showing a subroutine of a slip control region setting process in the first embodiment of the invention.

FIG. 7 is a flow chart showing a subroutine of a slip control region setting process in the first embodiment of the invention.

When the engine 71 is started, the slip control starting throttle opening $\theta_1$ and the slip control ending throttle opening $\theta_2$ are initialized, and the slip control is made on the basis of the initial values.

If the lockup clutch unit 14 is in the overheated state and if the slip control region AR3 is changed by the slip control region changing means 93, the slip control is made on the basis of the slip control starting throttle opening $\theta_1$ and the slip control ending throttle opening $\theta_2$.

When the engine 71 is then stopped and started again, the slip control starting throttle opening $\theta_1$ and the slip control ending throttle opening $\theta_2$ are initialized, and the slip control is made on the basis of the initial values.

If the lockup clutch unit 14 is in the overheated state and if the slip control region AR3 is changed by the slip control region changing means 93, the slip control is made on the basis of the slip control starting throttle opening $\theta_1$ and the slip control ending throttle opening $\theta_2$.

When the engine 71 is then stopped and started again, the slip control starting throttle opening $\theta_1$ and slip control ending throttle opening $\theta_2$, as changed during the engine drive preceding the present one, and the slip control starting throttle opening $\theta_1$ and slip control ending throttle opening $\theta_2$, as changed during the engine drive preceding the previous one, are compared so that the slip control is made on the basis of the larger slip control starting throttle opening $\theta_1$ and slip control ending throttle opening $\theta_2$.

Step S2-1: It is determined whether this is the first subroutine after the engine 71 has been started. The routine advances to Step S2-3, if this answer is "YES", but to Step S2-2 if "NO".

Step S2-2: It is determined whether the slip control region AR3 has been changed by the slip control region changing means 93, that is, whether the values S2 and E2, as stored in the buffer of the not-shown memory, are 0. The routine advances to Step S2-14, if this answer is "NO", but to Step S2-13 if "YES".

Step S2-3: It is determined whether the values S1 and E1, as stored in the buffer of the memory, are 0. The routine advances to Step S2-5, if the answer is "NO", but to Step S2-4 if "YES".

Step S2-4: The values of the slip control starting throttle opening $\theta_1$ and slip control ending throttle opening $\theta_2$, as changed during the engine drive preceding the present one, and the values of the slip control starting throttle opening $\theta_1$ and slip control ending throttle opening $\theta_2$, as changed during the engine drive preceding the previous one, that is, the values S2 and E2 and the values S3 and E3 are set to 0, and the initial values of the slip control starting throttle opening $\theta_1$ and slip control ending throttle opening $\theta_2$, that is, the values S1 and E1 are set to their initial values S0 and E0.

Step S2-5: It is determined whether the values S3 and E3, as stored in the buffer of the memory, are 0. The routine advances to Step S2-8, if the answer is "NO", but to Step S2-6 if "YES".

Step S2-6: The values S3 and E3 are set to the values S2 and E2.

Step S2-7: The values S2 and E2 are set to 0.

Step S2-8: It is determined whether the values S2 and E2 are 0. The routine advances to Step S2-9, if the answer is "NO", but to Step S2-13 if "YES".

Step S2-9: It is determined whether the value of the slip control starting throttle opening $\theta_1$, as changed during the preceding engine drive, is larger than the value of the slip control starting throttle opening $\theta_1$, as changed during the engine drive preceding the previous one, that is, whether or not the value S2 is greater than or equal to the value S3. The routine advances to Step S2-11, if the answer is "YES", but to Step S2-10 if "NO".

Step S2-10: The values S1 and E1 are set to the values S3 and E3.

Step S2-11: The values S1 and E1 are set to the values S2 and E2.

Step S2-12: The values S2, E2, S3 and E3 are set to 0.

Step S2-13: The slip control starting throttle opening $\theta_1$ is set to S1, and the slip control ending throttle opening $\theta_2$ is set to E1.

Step S2-14: The slip control starting throttle opening $\theta_1$ and the slip control ending throttle opening $\theta_2$ are changed by setting the slip control starting throttle opening $\theta_1$ to the value S2 and the slip control ending throttle opening $\theta_2$ to the value E2.

A subroutine of the slip control region changing process of Step S6 of FIG. 5 is described as follows.

Figure 8:
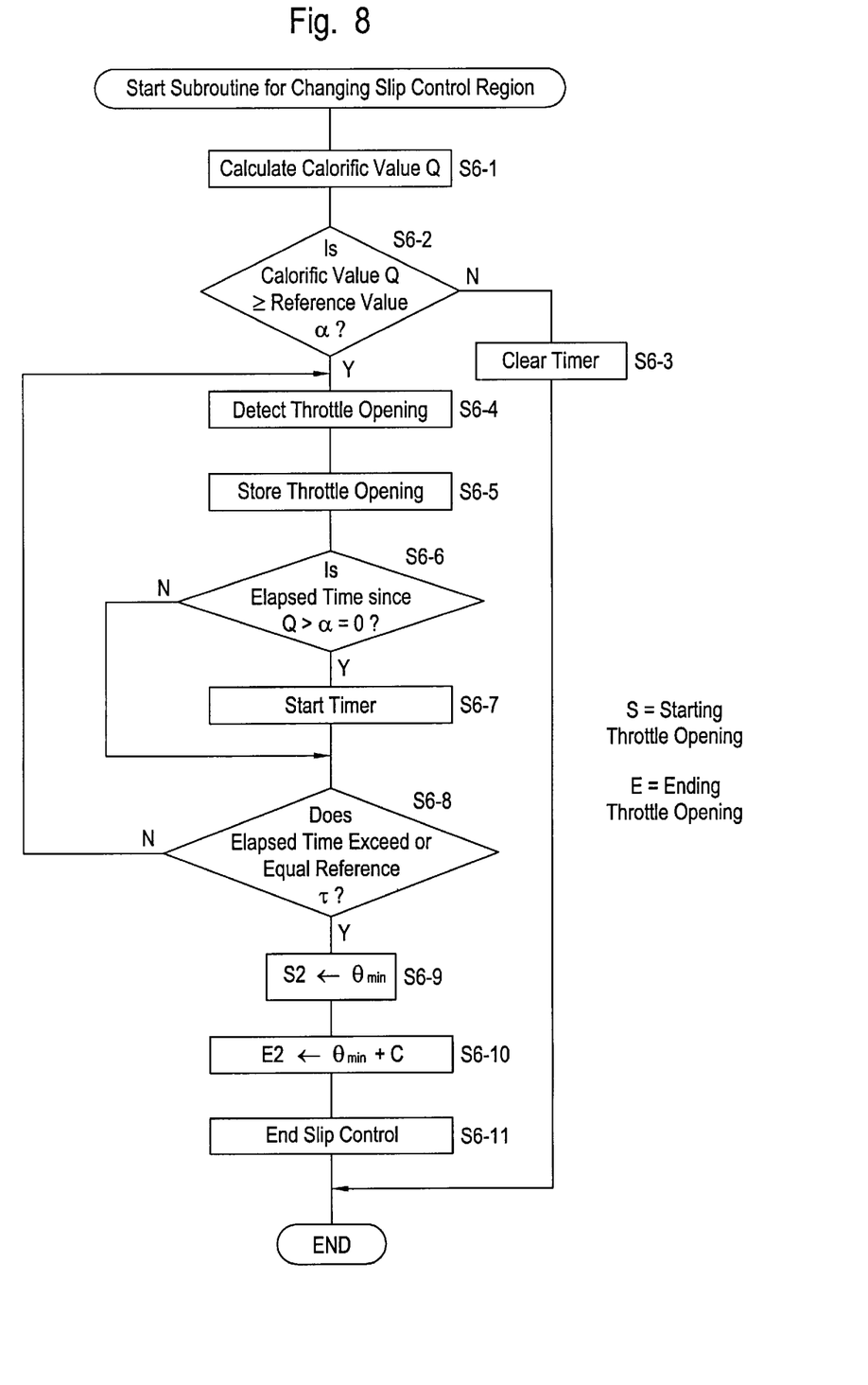
FIG. 8 is a flow chart showing a subroutine of a slip control region changing process in the first embodiment of the invention.
Figure 9:
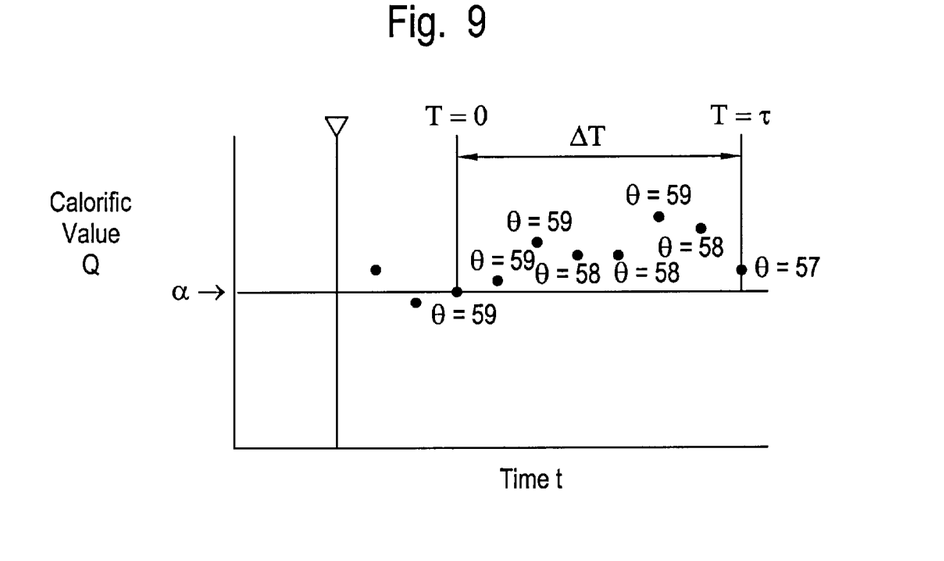
FIG. 9 is a first diagram for explaining the slip control region changing process in the first embodiment of the invention.
Figure 10:
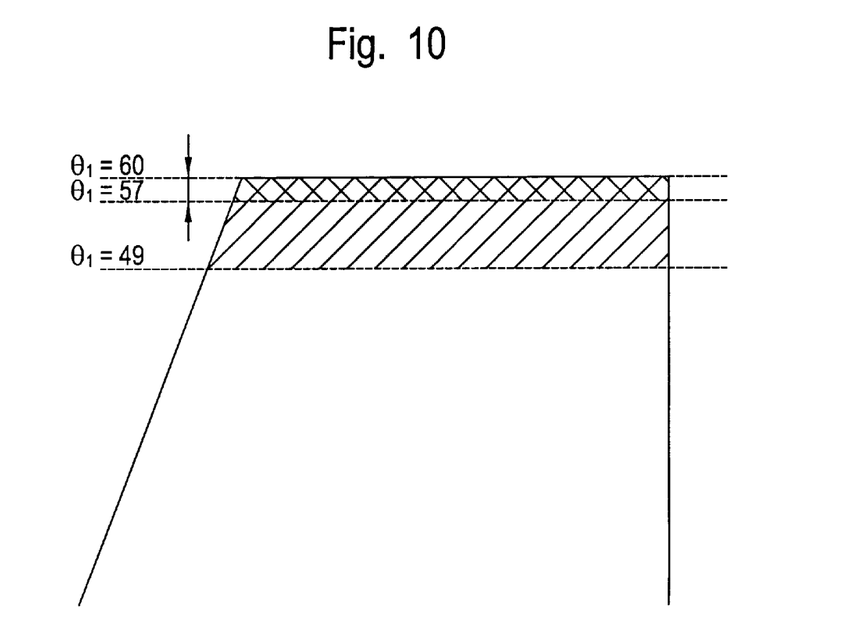
FIG. 10 is a second diagram for explaining the slip control region changing process in the first embodiment of the invention.

FIG. 8 is a flow chart showing a subroutine of a slip control region changing process in the first embodiment of the invention; FIG. 9 is a first diagram for explaining the slip control region changing process in the first embodiment of the invention; and FIG. 10 is a second diagram for explaining the slip control region changing process in the first embodiment of the invention. In FIG. 9, an abscissa indicates the time t, and an ordinate indicates the calorific value Q.

First of all, the calorific value Q in the lockup clutch unit 14 (of FIG. 1) is calculated. If this calorific value Q is higher than the reference value $\alpha$, the throttle opening $\theta$ is repeatedly detected for a predetermined throttle opening detecting time period $\Delta T$, and the minimum $\theta_{MIN}$ of the detected throttle openings $\theta$ is employed as the slip control starting throttle opening $\theta_1$. The slip control ending throttle opening $\theta_2$ is determined by adding a preset hysteresis constant C to the minimum $\theta_{MIN}$.

Step S6-1: The not-shown calorific value calculating means of the state determining means 92 calculates the calorific value Q in the lockup clutch unit 14.

In this case, the calorific value Q can be expressed by the following formula on the basis of the actual slippage $\Delta N$ and a torque $T_{L/C}$ to be transmitted by the lockup clutch unit 14:

$$Q = \Delta N \cdot T_{L/C}.$$

This torque $T_{L/C}$ can be expressed by the following formula if the coefficient of friction of the friction member 20 of the torque converter 10 is designated by m, if the apply pressure of the lockup clutch unit 14 is designated by $\Delta P$ and if the effective radius of the lockup clutch unit 14 is designated by r:

$$T_{L/C} = m \times \Delta P \times r$$

The apply pressure $\Delta P$ is produced to correspond to the solenoid pressure $P_{SLU}$ of the linear solenoid valve 79.

Step S6-2: The not-shown compare means of the state determining means 92 compares the calorific value Q and the reference value $\alpha$ to determine whether the lockup clutch unit 14 is in the overheated state. The routine advances to Step S6-4, if the calorific value Q is larger than the reference value $\alpha$, but to Step S6-3 if not.

Step S6-3: The routine is ended by clearing the not-shown timer.

Step S6-4: The throttle opening $\theta$ is detected.

Step S6-5: The detected throttle opening $\theta$ is stored in the not-shown memory.

Step S6-6: It is determined whether the elapsed time after the calorific value Q has exceeded the reference value $\alpha$, that is, the counted value T is 0. The routine advances to Step S6-7, if the answer is "YES", but to Step S6-8 if "NO".

Step S6-7: The timing of the timer is started.

Step S6-8: It is determined whether the counted value T is larger than a set value t. The routine advances to Step S6-9, if the answer is "YES", but the routine goes to step 504 if the answer is "NO".

Step S6-9: The slip control region changing means 93 of the automatic transmission control unit 80 determines the minimum $\theta_{MIN}$ of the detected individual throttle openings $\theta$ for the throttle opening detecting time period $\Delta T$ until the counted value T increases from 0 to the set value t, to set the value S2 to the minimum $\theta_{MIN}$. For example, if the throttle opening $\theta$, as detected for the throttle opening detecting time period $\Delta T$, is 57 [%], 58 [%] and 59 [%], as shown in FIG. 9, the value S2 is set to 57 [%] as the minimum $\theta_{MIN}$.

Step S6-10: The slip control region changing means 93 of the automatic transmission control unit 80 adds the preset hysteresis constant C to the minimum $\theta_{MIN}$ and sets the value E2 to the sum.

Step S6-11: The slip control is forcibly ended because the calorific value Q is larger than the reference value a.

Subsequently through the aforementioned subroutine of the slip control region setting process, the slip control starting throttle opening $\theta_1$ and the slip control ending throttle opening $\theta_2$ are set.

If the slip control starting throttle opening $\theta_1$, as changed during the previous engine drive, is 49 [%] and if the slip control starting throttle opening $\theta_1$, as changed during the engine drive preceding the previous one, is 57 [%], as shown in FIG. 10, the slip control starting throttle opening $\theta_1$ is set to 57 [%] by the operations of Steps S2-9, S2-10 and S2-11 of FIG. 7.

Thus, in the slip control region AR3 as set under the vehicle running conditions, the oil pressure regulating means 91 regulates the oil pressure to slip the lockup clutch unit 14 thereby to make the slip control. During this slip control, the heating state, as generated according to the slip control, is determined by the state determining means 92 so that the slip control region changing means 93 changes the slip control region AR3 on the basis of the determined heat state.

Irrespective of the production dispersion and aging of the lockup clutch unit 14, therefore, the slip control can be properly made to confine the calorific value Q within a proper range.

As a result, it is possible to elongate the lifetime of the lockup clutch unit 14 and to improve the mileage.

Moreover, it is possible without adding any new part to determine whether the lockup clutch unit 14 is in the overheated state.

When the counted value T exceeds the set value t after the calorific value Q has exceeded the reference value a, it is determined that the lockup clutch unit 14 is in the overheated state. Thus, it is possible to accurately determine that the calorific value Q is larger than the reference value a.

A second embodiment of the invention is described below.

Figure 11:
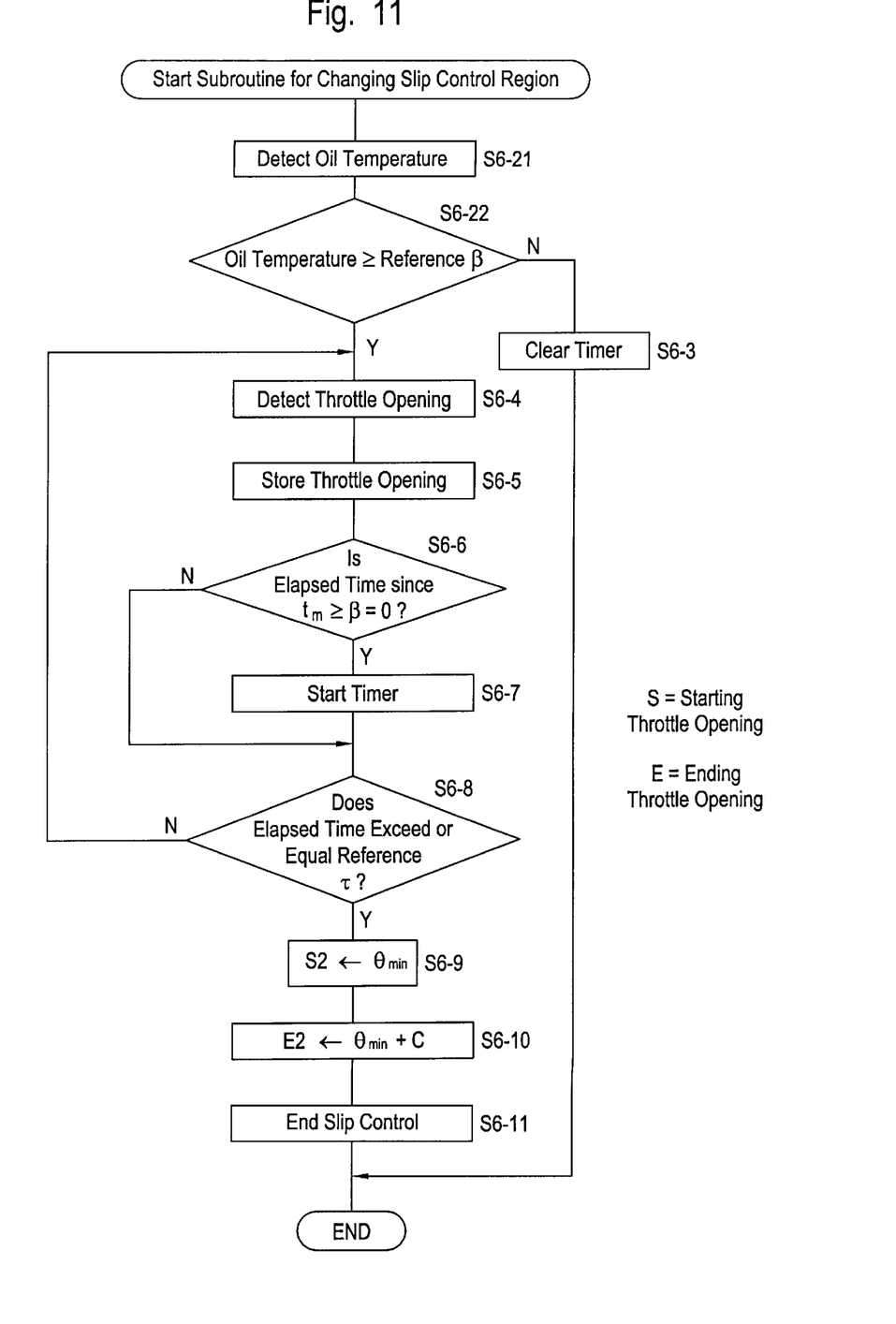
FIG. 11 is a flow chart showing a subroutine of a slip control region changing process in the second embodiment of the invention.

FIG. 11 is a flow chart showing a subroutine of a slip control region changing process in the second embodiment of the invention.

It is determined on the basis of the oil temperature $t_m$ in the torque converter 10 (of FIG. 1) whether the slip control region AR3 (of FIG. 4) is to be changed.

Step S6-21: The state detecting means 92 detects the oil temperature $t_m$ in terms of the oil temperature signal, as sent from the oil temperature sensor 83.

Step S6-22: The not-shown compare means of the state determining means 92 compares the oil temperature $t_m$ and a reference value β. The routine advances to Step S6-4, if the oil temperature $t_m$ is larger than the reference value β, but to Step S6-3 if not.

The subsequent operations are identical to those of the subroutine of the slip control region changing process of FIG. 8 in the first embodiment so that their description will be omitted.

In this case, whether the lockup clutch is in the overheated state can be determined by using the oil temperature sensor 83 but not adding any new part.

The invention should not be limited to its foregoing embodiments but can be modified in various manners while still remaining within the scope of the invention as defined by the claims.

As has been described in detail, according to the invention, the slip control system comprises: a fluid coupling including a released side oil chamber, an applied side oil chamber and a lockup clutch unit to be applied/released on the basis of the oil pressure, as fed to at least one of the released side oil chamber and the applied side oil chamber; an oil pressure generating unit for generating the oil pressure; a vehicular running state detecting unit for detecting a vehicular running state; an electronic control unit for determining whether a slip control is to be made, on the basis of a determination upon whether the present vehicular running state, as detected by the vehicular running state detecting means, belongs to a predetermined slip control region; and an oil pressure regulating unit for regulating the oil pressure in response to a signal coming from the electronic control unit, to activate the slip control by sliding the lockup clutch unit. The electronic control unit includes: state determining means for determining the state of a heat, as generated according to the slip control; and slip control region changing means for changing the slip control region on the basis of the heat state, as determined by the state determining means.

In the slip control region as set under the vehicular running conditions, the oil pressure regulating unit regulates the oil pressure to activate the slip control by sliding the lockup clutch unit. During this slip control, the heating state, as generated according to the slip control, is determined by the state determining means so that the slip control region changing means changes the slip control region on the basis of the determined heat state.

Irrespective of the production dispersion and aging of the lockup clutch unit, therefore, the slip control can be properly made to confine the calorific value within a proper range.

As a result, it is possible to elongate the lifetime of the lockup clutch unit and to improve the mileage.

In another slip control system of the invention, the state determining means determines whether the lockup clutch unit is in an overheated state.

In this slip control system, it is determined during the slip control whether the lockup clutch unit is in the overheated state.

In still another slip control system of the invention, the state determining means has calorific value calculating means for calculating the calorific value of the lockup clutch unit, and compare means for comparing the calculated calorific value and a predetermined reference value.

Whether the lockup clutch unit is in the overheated state is determined on the basis of the comparison result by the compare means.

In this case, whether the lockup clutch is in the overheated state can be determined without adding any new part.

Still another slip control system of the invention further comprises oil temperature detecting means for detecting an oil temperature in the fluid coupling, and the state determining means has compare means for comparing the oil temperature, as detected by the oil temperature detecting means, and a predetermined reference value.

Whether the lockup clutch unit is in the overheated state is determined on the basis of the comparison result by the compare means.

In this case, whether the lockup clutch is in the overheated state can be determined by using the oil temperature detecting means but not adding any new part.

In still another slip control system, the vehicular running state detecting means includes a throttle opening sensor.

In this case, the slip region changing means changes the slip control region, if the state, in which the calorific value is larger than the reference value, continues for a predetermined time period or longer, on the basis of the throttle opening for the time period, and ends the slip control. As a result, it is possible to accurately determine the state in which the calorific value is larger than the reference value.

What is claimed is:

1. A slip control system for a lockup clutch unit of a torque converter, acting as a fluid coupling, of an automatic transmission, comprising:

the fluid coupling including a release side oil chamber, an apply side oil chamber and the lockup clutch unit that is applied and released by an oil pressure that is fed to at least one of said release side oil chamber and said apply side oil chamber;

an oil pressure generating unit for generating said oil pressure;

a vehicular running state detecting unit for detecting a vehicular running state;

an electronic control unit for determining whether a slip control of the lockup clutch unit is to be made on the basis of a determination whether a present vehicular running state, as detected by said vehicular running state detecting unit, falls within a predetermined slip control region wherein a friction member attached to a clutch plate of the lockup clutch unit slides relative to a cover of the torque converter; and an oil pressure regulating unit for regulating said oil pressure in response to a signal coming from said electronic control unit, to provide the slip control by slippage of the lockup clutch unit, wherein said electronic control unit includes:

state determining means for determining a heated state of the lockup clutch unit, as generated according to the slip control by the slippage of the lockup clutch unit; and slip control region changing means for reducing the slip control region when it is determined by said state determining means that the lockup clutch unit is in an overheated state.

2. The automatic transmission slip control system according to claim 1, further comprising:

oil temperature detecting means for detecting an oil temperature in said fluid coupling, wherein said state determining means has compare means for comparing the oil temperature, as detected by said oil temperature detecting means, and a predetermined reference value, so that whether said lockup clutch unit is in the overheated state is determined on the basis of a comparison result by said compare means.

3. The automatic transmission slip control system according to claim 1, wherein said state determining means has calorific value calculating means for calculating a calorific value of said lockup clutch unit, and compare means for comparing the calculated calorific value and a predetermined reference value, so that whether said lockup clutch unit is in the overheated state is determined on the basis of a comparison result by said compare means.

4. The automatic transmission slip control system according to claim 3, wherein said vehicular running state detecting unit includes a throttle opening sensor, and wherein said slip control region changing means changes the slip control region, if a state, in which said calorific value is larger than said reference value, continues for at least a predetermined time period, on the basis of a throttle opening detected by said throttle opening sensor during the time period, and ends the slip control.

* * * * *